US010085155B2

(12) United States Patent
Han et al.

(10) Patent No.: US 10,085,155 B2
(45) Date of Patent: Sep. 25, 2018

(54) METHOD FOR FAST CHANNEL MEASUREMENT AND FEEDBACK IN A LTE LICENSED-ASSISTED ACCESS BASED COMMUNICATION SYSTEM

(71) Applicant: Alcatel Lucent, Boulogne-Billancourt (FR)

(72) Inventors: Feng Han, Shanghai (CN); Teck Hu, Melbourne, FL (US); Shin Horng Wong, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 15/510,129

(22) PCT Filed: Aug. 13, 2015

(86) PCT No.: PCT/IB2015/001550
§ 371 (c)(1),
(2) Date: Mar. 9, 2017

(87) PCT Pub. No.: WO2016/046612
PCT Pub. Date: Mar. 31, 2016

(65) Prior Publication Data
US 2017/0295498 A1 Oct. 12, 2017

(30) Foreign Application Priority Data

Sep. 24, 2014 (CN) .......................... 2014 1 0494746

(51) Int. Cl.
*H04W 4/00* (2018.01)
*H04W 16/14* (2009.01)
(Continued)

(52) U.S. Cl.
CPC ....... *H04W 16/14* (2013.01); *H04W 72/0413* (2013.01); *H04W 84/12* (2013.01)

(58) Field of Classification Search
None
See application file for complete search history.

(56) References Cited

U.S. PATENT DOCUMENTS

2012/0250631 A1* 10/2012 Hakola ............... H04L 5/001
370/329
2012/0264468 A1 10/2012 Turtinen et al.
(Continued)

FOREIGN PATENT DOCUMENTS

CN 102281595 A 12/2011
JP 2013-544062 A 12/2013
(Continued)

OTHER PUBLICATIONS

Huawei et al: "Scope and Workplan for the Study on Licensed-Assisted Access", vol. TSG RAN, No. Edinburgh; Sep. 9, 2014-Sep. 12, 2014, Sep. 10, 2014 (Sep. 10, 2014), XP050785059, Retrieved from the Internet <URL:http://www.3gpp.org/ftp/Meetings_3GPP_SYNC/RAN/Docs/> [retrieved on Sep. 10, 2014].

(Continued)

*Primary Examiner* — Otis L Thompson, Jr
(74) *Attorney, Agent, or Firm* — Harness, Dickey & Pierce, P.L.C.

(57) ABSTRACT

According an embodiment the method includes sending a RRC connection reconfiguration message to a user equipment, the RRC connection reconfiguration message including at least one energy sensing threshold corresponding to at least one unlicensed channel; and receiving a Layer 1 channel indication message via a licensed channel from the user equipment, the Layer 1 channel indication message indicating whether an unlicensed channel is free.

18 Claims, 3 Drawing Sheets

(51) Int. Cl.
*H04W 72/04* (2009.01)
*H04W 84/12* (2009.01)

(56) References Cited

U.S. PATENT DOCUMENTS

| | | | |
|---|---|---|---|
| 2013/0143502 A1 | 6/2013 | Kazmi et al. | |
| 2014/0044000 A1 | 2/2014 | Charbit et al. | |
| 2015/0189574 A1* | 7/2015 | Ng | H04W 24/08 370/252 |
| 2015/0296486 A1* | 10/2015 | Park | H04W 76/025 370/329 |
| 2016/0007350 A1* | 1/2016 | Xiong | H04W 24/10 370/252 |
| 2016/0066325 A1* | 3/2016 | Kim | H04W 72/1215 370/329 |
| 2016/0073344 A1* | 3/2016 | Vutukuri | H04W 52/0216 370/252 |
| 2016/0088635 A1* | 3/2016 | Davydov | H04L 1/1812 370/329 |
| 2016/0219475 A1* | 7/2016 | Kim | H04W 76/025 |
| 2016/0227416 A1* | 8/2016 | Suzuki | H04W 72/0453 |
| 2017/0048879 A1* | 2/2017 | Zhang | H04W 72/12 |
| 2017/0280330 A1* | 9/2017 | Martin | H04W 16/14 |
| 2017/0311206 A1* | 10/2017 | Ryoo | H04W 28/18 |

FOREIGN PATENT DOCUMENTS

| | | |
|---|---|---|
| JP | 2014-519279 A | 8/2014 |
| JP | 2015-536599 A | 12/2015 |
| JP | 2017-517985 A | 6/2017 |
| WO | WO-2013/096563 A1 | 6/2013 |
| WO | WO-2013/161135 A1 | 10/2013 |
| WO | WO-2014/060543 A1 | 4/2014 |
| WO | WO-2016/003610 A1 | 1/2016 |

OTHER PUBLICATIONS

International Search Report PCT/ISA/210 for International Application No. PCT/IB2015/001550 dated Jan. 11, 2016.

NTT DOCOMO, Inc., "Views on LAA for Unlicensed Spectrum—Scenarios and Initial Evaluation Results" 3GPP workshop, Jun. 13, 2014, Retrieved from the Internet<URL: http://www.3gpp.org/ftp/workshop/2014-06-13_LTE-U/Docs/RWS-140026.zip>.

* cited by examiner

METHOD FOR FAST CHANNEL MEASUREMENT AND FEEDBACK IN A LTE LICENSED-ASSISTED ACCESS BASED COMMUNICATION SYSTEM

CROSS-REFERENCE TO RELATED APPLICATIONS

This application is a national phase under 35 U.S.C. § 371 of PCT International Application No. PCT/IB2015/001550 which has an International filing date of Aug. 13, 2015, which claims priority to Chinese Application No. 201410494746.2, filed Sep. 24, 2014, the entire contents of each of which are hereby incorporated by reference.

FIELD OF THE INVENTION

The present invention relates to communication technology, more particularly, to a method and an apparatus for fast channel measurement and feedback in a LTE licensed-assisted access (LAA) based communication system.

BACKGROUND OF THE INVENTION

With the increasing traffic demand, cellular operators plan to evaluate the feasibility of using unlicensed spectrum for LTE for Rel-13, i.e. LTE-U. The first stage of LTE-U would aggregate the unlicensed carrier as a Supplemental Downlink (SDL) with a primary carrier in licensed bands.

On these unlicensed bands/channels, multiple RAT nodes, e.g. LTE, WiFi nodes and etc., may coexist with each other. FIG. 1 shows Inter-RAT interference problems such as the well known hidden node problem between LTE-U and LTE-U networks or LTE-UE and WiFi networks. For WiFi to WiFi hidden node problem, the well known CSMA with Collision Avoidance utilizing the RTS/CTS mechanism is used. In such a mechanism, a Listen Before Talk is used where the WiFi AP or terminal would sense for the channel before transmitting any packet.

In order to make LTE-U coexist with other RAT nodes in the unlicensed band, a CSMA utilizing Listen Before Talk mechanism is required. Now for any node in WiFi, it can send a RTS to another node when it wishes to send data to that node, and the recipient node needs to response with a CTS. However, since the uplink in 1st version of LTE-U uses the licensed spectrum, the role of the original CTS is limited. This is because that the neighboring nodes will not listen to the unlicensed band to receive the CTS. Hence it can be appreciated that the Cis feedback in WiFi cannot be used directly in LTE-U.

On the other hand, if a user equipment (UE) reports a discovery reference signal (DRS) based CQI to a serving node to make the serving node determine the situation of the unlicensed channel, a following problem will appear. For LTE-U off-to-on transition, because DRS is periodically transmitted, e.g. 40/80/160 milliseconds, the DRS-based CQI may not fast enough to tell the channel situations. Hence, DRS-based CQI may not be suitable for indicating the channel.

Further, if a UE uses a long term L3 layer report to indicate the situation of an unlicensed channel, a drawback that it could not fast reflect the channel situation will also appear.

SUMMARY OF THE INVENTION

In view of the above, this invention proposes a method and an apparatus for fast channel measurement and feedback in a LTE licensed-assisted access (LAA) based communication system, in which the downlink uses unlicensed channels and the uplink uses licensed channels.

According to a first aspect of the present invention, there provides a method for fast channel measurement and feedback in a serving node in a. LTE Licensed-Assisted Access (LAA) based communication system, the method comprising the steps of: A. sending a RRC connection reconfiguration message to a user equipment, the RRC connection reconfiguration message including at least one energy sensing threshold corresponding to at least one unlicensed channel; and D. receiving a Layer 1 channel indication message via a licensed channel from the user equipment, the Layer 1 channel indication message indicating whether an unlicensed channel is free.

Advantageously, the RRC connection reconfiguration message further includes: at least one sensing period, at least one subframe offset, at least one PUCCH resource location indicator and at least one PUCCH resource index, which correspond to the at least one unlicensed channel respectively, wherein a sensing period is used to indicate a period which is used by the user equipment to sense a corresponding unlicensed channel and send a Layer 1 channel indication message for the corresponding unlicensed channel, a subframe offset is used to indicate a beginning point when the user equipment senses the corresponding unlicensed channel, a PUCCH resource location indicator is used to indicate a PUCCH resource used by the user equipment to send the Layer 1 channel indication message for the corresponding unlicensed channel, a PUCCH resource index is used to assist the user equipment in code division multiplexing the PUCCH resource; and the step D further includes: receiving the Layer 1 channel indication message via the licensed channel on the PUCCH resource from the user equipment periodically.

Advantageously, the method further includes step B between the step A and the step D: B. receiving a RRC connection reconfiguration complete message from the user equipment.

Advantageously, the method further includes step C between the step B and the step D: C. sending an unlicensed channel sensing trigger command to the user equipment, the unlicensed channel sensing trigger command indicating the user equipment to sense the at least one unlicensed channel; and the step D further includes: receiving the Layer 1 channel indication message via the licensed channel from the user equipment through PUCCH.

Advantageously, the unlicensed channel sensing trigger command includes a MAC control element and a Layer 1 command.

Advantageously, the Layer 1 channel indication message includes 1 bit to indicate whether the unlicensed channel is free, when the serving node has no WLAN transceiver capability.

Advantageously, the Layer 1 channel indication message includes a destination field and a duration field for indicating a free duration of the unlicensed channel, when the serving node has WLAN transceiver capability.

Advantageously, the serving node includes a WLAN access node and a base station.

According to a second aspect of the present invention, there provides a method for fast channel measurement and feedback in a user equipment in a LTE Licensed-Assisted Access (LAA) based communication system, the method comprising the steps of: a. receiving a RRC reconfiguration message from a serving node, the RRC connection reconfiguration message including at least one energy sensing threshold corresponding to at least one unlicensed channel; d. sensing a corresponding unlicensed channel according to an energy sensing threshold to determine whether the corresponding unlicensed channel is free; and e. sending a Layer 1 channel indication message via a licensed channel to the serving node, the Layer 1 channel indication message indicating whether the corresponding unlicensed channel is free.

Advantageously, the RRC connection reconfiguration message further includes: at least one sensing period, at least one subframe offset, at least one is PUCCH resource location indicator and at least one PUCCH resource index, which correspond to the at least one unlicensed channel respectively; and the step d further includes: determining a beginning point to sense a corresponding unlicensed channel based on a subframe offset, and sensing the corresponding unlicensed channel according to an energy sensing threshold periodically based on a sensing period to determine whether the corresponding unlicensed channel is free; the step e further includes: e1. determining a PUCCH resource used to send the Layer 1 channel indication message for the corresponding unlicensed channel according to a PUCCH resource location indicator; and e2. code division multiplexing the PUCCH resource according to a PUCCH resource index, so as to send the Layer 1 channel indication message on the code division multiplexed PUCCH resource via the licensed channel to the serving node periodically based on the sensing period.

Advantageously, the method further includes step b between the step a and the step d: b. sending a RRC connection reconfiguration complete message to the serving node.

Advantageously, the method further includes step c between the step b and the step d: c. receiving an unlicensed channel sensing trigger command from the serving node, the unlicensed channel sensing trigger command indicating the user equipment to sense the at least one unlicensed channel; and the step e further includes: time multiplexing the Layer 1 channel indication message with uplink data and other control signalings, and sending the time multiplexed Layer 1 channel indication message via the licensed channel through PUSCH.

According to a third aspect of the present invention, there provides an apparatus for fast channel measurement: and feedback in a serving node in a LTE Licensed-Assisted Access (LAA) based communication system, the apparatus comprising: a RRC connection reconfiguration message sending unit, configured for sending a RRC connection reconfiguration message to a user equipment, the RRC connection reconfiguration message including at least one energy sensing threshold corresponding to at least one unlicensed channel; and a Layer 1 channel indication message receiving unit, configured for receiving a Layer 1 channel indication message via a licensed channel from the user equipment, the Layer 1 channel indication message indicating whether an unlicensed channel is free.

According to a fourth aspect of the present invention, there provides an apparatus for fast channel measurement and feedback in a user equipment in a LTE Licensed-Assisted Access (LAA) based communication system, the apparatus comprising: a RRC reconfiguration message receiving unit, configured for receiving a RRC reconfiguration message from a serving node, the RRC connection reconfiguration message including at least one energy sensing threshold corresponding to at least one unlicensed channel; a. sensing unit, configured for sensing a corresponding unlicensed channel according to an energy sensing threshold to determine whether the corresponding unlicensed channel is free; and a Layer 1 channel indication message sending unit, configured for sending a Layer 1 channel indication message via a licensed channel to the serving node, the Layer 1 channel indication message indicating whether the corresponding unlicensed channel is free.

With the present invention, a serving node, such as a base station, a WiFi access point, can obtain the situation of an unlicensed channel fast and reliably. The serving node can use an unlicensed channel in time, when the unlicensed channel is free. Thus, the throughput of the whole system could be enhanced. The above periodic and aperiodic solutions can solve the hidden node problem.

BRIEF DESCRIPTION OF DRAWINGS

With reference to the following detailed description of the non-restrictive embodiments, other features, objects and advantages of the present invention will be more apparent.

Wherein same or similar reference numerals refer to same or similar apparatuses (modules) or steps.

DETAILED DESCRIPTION OF EMBODIMENTS

The basic idea of the solution is to introduce a new Layer 1 channel indication message. This new Layer 1 channel indication message is based on energy detection and/or measurement on the inter-RAT signal or pilot of other RATs. The said Layer 1 channel indication message would have the following functions:

1) Acting as a previous CTS, for example as a response to a RTS from a serving node operating in an unlicensed channel.
2) indicating whether an unlicensed channel is busy.
3) Indicating the free duration of the unlicensed channel.

Since an unlicensed channel is shared by several RAT nodes, the occupancy of this channel is dynamic and hence the LTE-U base station should need to be able to seize this channel as fast as possible whenever the channel is free. Recognizing this, a Layer 1 channel indication message feedback is advantageous. On the contrary, a conventional RRC measurement feedback is too slow for this purpose.

Further, as described in background, the transmission frequency of DRS is low. Therefore, Layer 1 DRS-based CQI is not suitable, either.

The key points of this Layer 1 channel indication message include:

1. Under the configuration of a serving node, the Layer 1 channel indication message could be periodically or aperiodically reported. Further, the serving node can configure an energy sensing threshold and other parameters for an unlicensed channel. UE senses the unlicensed channel, and sends the result as the Layer 1 channel indication message to the serving node.

2. The Layer 1 channel indication message can be sent over the PUCCH or PUSCH resources on a licensed channel.

If the Layer 1 channel indication message is configured as periodic, it will be sent over PUCCH. Each UE can be assigned a dedicated PUCCH resource, and this PUCCH resource corresponds to an unlicensed channel. This means that each unlicensed channel corresponds to a dedicated PUCCH resource. The dedicated PUCCH resource could be identified by a transmission period, a subframe offset and etc. With this dedicated PUCCH resource, there is no need to provide the unlicensed channel ID as the ID of the unlicensed channel is implicitly known from the dedicated PUCCH resource upon which the Layer 1 channel indication message is sent. Here, a new dedicated PUCCH resource is proposed, that is, PUCCH format 4. When the UE detects the channel is available for use, it would send the Layer 1 channel indication message at the next allowed period.

If the Layer 1 channel indication message is configured as aperiodic, it will be sent over PUSCH and be multiplexed with UL data and other control signalings. Here, the serving node sends an unlicensed channel sensing trigger command to the UE via a licensed channel. In an embodiment of the present invention, this unlicensed channel sensing trigger command includes the ID of the unlicensed channel to be sensed, for example.

Each embodiment will be described in detail with reference to the figures in the following.

Figure 1:
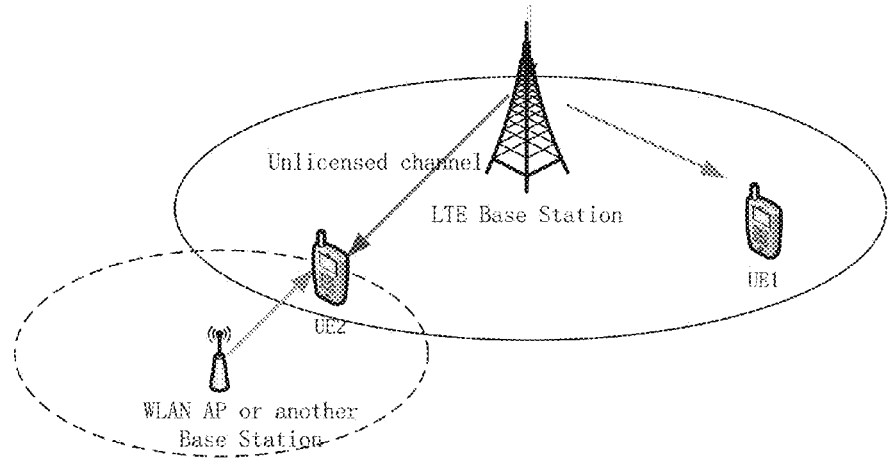
FIG. 1 shows a schematic diagram of the hidden node problem.
Figure 2:
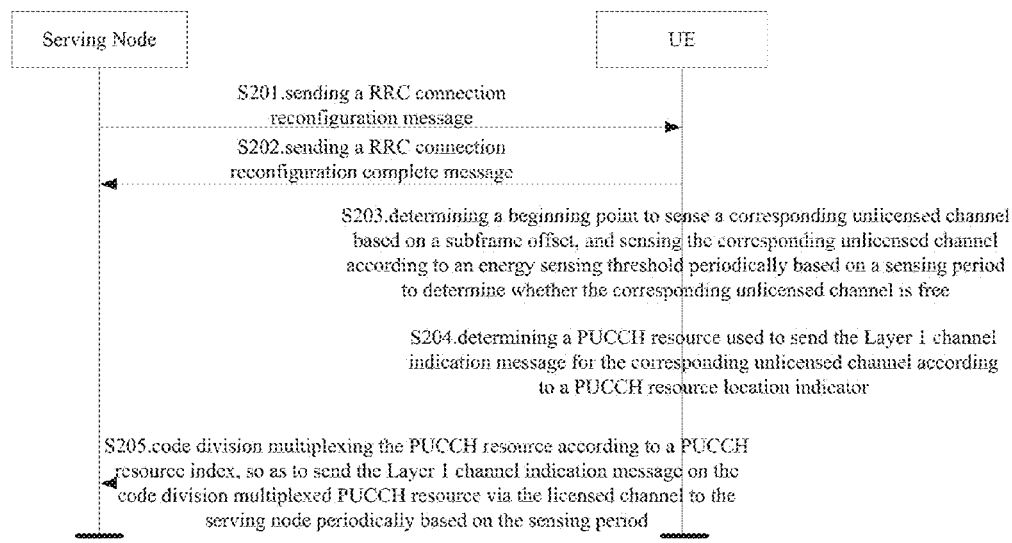
FIG. 2 shows a method flowchart of a method for fast channel measurement and feedback in a LTE licensed-assisted access (LAA) based communication system according to one embodiment of the present invention.

FIG. 2 shows a method flowchart of a method for fast channel measurement and feedback in a LTE licensed-assisted access (LAA) based communication system according to one embodiment of the present invention. In the embodiment in FIG. 2, the UE will send a Layer 1 channel indication message to the serving node periodically.

As shown in FIG. 2, in the step S201, the serving node sends a RRC connection reconfiguration message to the UE. This RRC connection reconfiguration message includes the following parameters: at least one energy sensing threshold, at least one sensing period, at least one subframe offset, at least one PUCCH resource location indicator $\Delta_{shift-unlicensed}^{PUCCH}$ and at least one PUCCH resource index $n_{PUCCH}^{(4,\tilde{p})}$. Those parameters correspond to at least one unlicensed channel respectively.

Herein, the energy sensing threshold for the corresponding unlicensed channel is used to indicate that UE senses the unlicensed channel based on the energy sensing threshold.

The sensing period for the corresponding unlicensed channel is used to indicate a period which is used by the UE to sense the corresponding unlicensed channel and send a Layer 1 channel indication message for the corresponding unlicensed channel.

The subframe offset for the corresponding unlicensed channel is used to indicate a beginning point when the UE senses the corresponding unlicensed channel.

The PUCCH resource location indicator $\Delta_{shift-unlicensed}^{PUCCH}$ is used to indicate a PUCCH resource used by the UE to send the Layer 1 channel indication message for the corresponding unlicensed channel. As described above, in the present invention, a new PUCCH resource is defined. Herein, it will be described as PUCCH format 4.

The PUCCH resource index $n_{PUCCH}^{(4,\tilde{p})}$ is used to assist the UE in code division multiplexing the PUCCH resource. For example, according to the PUCCH resource index $n_{PUCCH}^{(4,\tilde{p})}$ the UE will derive the orthogonal sequence and the cycle shift corresponding to the unlicensed channel, such that multiple UEs can code division multiplexing the identical PUCCH resource.

In step S202, the UE sends a RRC connection reconfiguration complete message to the serving node.

Then, in step S203, the UE determines a beginning point to sense a corresponding unlicensed channel based on a subframe offset. And in step S203, the UE senses the corresponding unlicensed channel according to an energy sensing threshold periodically based on a sensing period to determine whether the corresponding unlicensed channel is free.

For example, if the UE senses that the energy of the inter-RAT signal and/or the pilots of other RAT nodes in the unlicensed channel is below the energy sensing threshold, it determines that this unlicensed channel is free. If the UE senses that the energy of the inter-RAT signal and/or the pilots of other RAT nodes in the unlicensed channel is above the energy sensing threshold, it determines that this unlicensed channel is busy.

Herein, the UE can also use the above parameters to sense the corresponding multiple unlicensed channel.

In step S204, the UE determines a PUCCH resource used to send the Layer 1 channel indication message for the corresponding unlicensed channel according to a PUCCH resource location indicator $\Delta_{shift-unlicensed}^{PUCCH}$.

In order to send the Layer 1 channel indication message, a new PUCCH format 4 is defined in Table 1. The PUCCH format 4 is capable of carrying 1 bit information which could generate a BPSK symbol.

TABLE 1

PUCCH format 4

| PUCCH format | Modulation scheme | Number of bit per subframe $M_{bit}$ |
| --- | --- | --- |
| 4 | BPSK | 1 |

Figure 3:
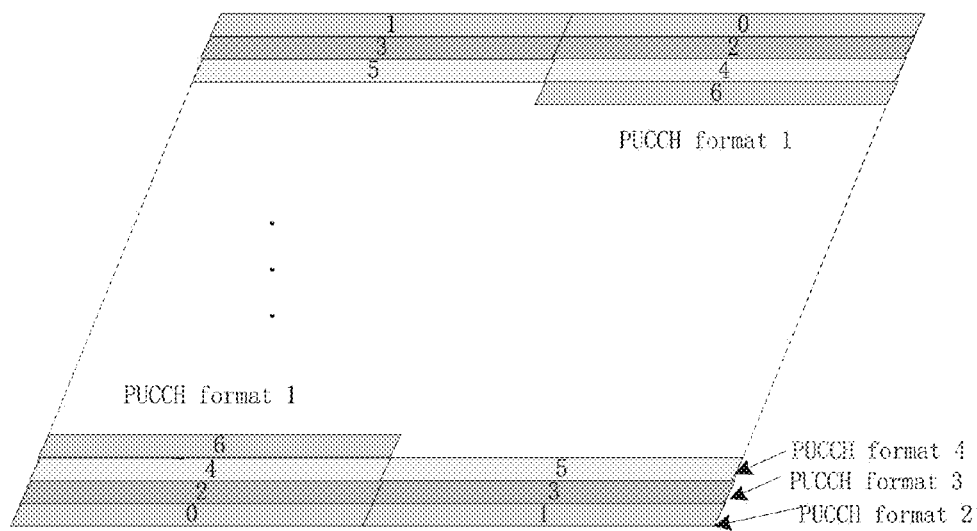
FIG. 3 shows a schematic diagram of PUCCH format 4 resource block according to one embodiment of the present invention.

The location of PUCCH format 4 could be semi-statically configured is by the serving node. For example, as shown in FIG. 3, the location of PUCCH format 4 is located between format 1 and format 2. Besides, one PUCCH format 4 resource corresponds to one unlicensed channel.

Then, in step S205, the UE code division multiplexes the PUCCH resource according to the PUCCH resource index $n_{PUCCH}^{(4,\tilde{p})}$. Specifically, by using the high-layer configured parameter $n_{PUCCH}^{(4,\tilde{p})}$ to derive the orthogonal sequence and cycle shift to code division multiplex the PUCCH resource, different UEs could share the same PUCCH resource. This means that if different UEs need to feedback for one unlicensed channel, those UEs can code division multiplex the corresponding PUCCH format 4 resource.

Also, in step S205, the UE sends the Layer 1 channel indication message on the code division multiplexed PUCCH resource via the licensed channel to the serving node periodically based on the sensing period, in order to indicate whether the corresponding unlicensed channel is free.

Advantageously, the Layer 1 channel indication message could be a simple 1 bit for indicating whether the unlicensed channel is busy or free. This is suitable for the serving node which has no WLAN transceiver capability. Alternatively, for WLAN AP or the base station with WLAN capability, the information included in the Layer 1 channel indication message can be identical with that in the CTS in the present WLAN, for example the information includes a destination field and a free duration field for the unlicensed channel.

Then, the serving node can use the free unlicensed channel for communication timely.

In a preferable embodiment of the present invention, after the UE senses multiple unlicensed channels, the UE can send multiple Layer 1 channel indication messages to the serving node. One Layer 1 channel indication message corresponds to one unlicensed channel. For the serving node, since there is a corresponding relationship between the PUCCH format 4 resource and the unlicensed channel, the serving node can derive the unlicensed channel indicated by the Layer 1 channel indication message implicitly based on the location of the PUCCH format 4.

Figure 4:
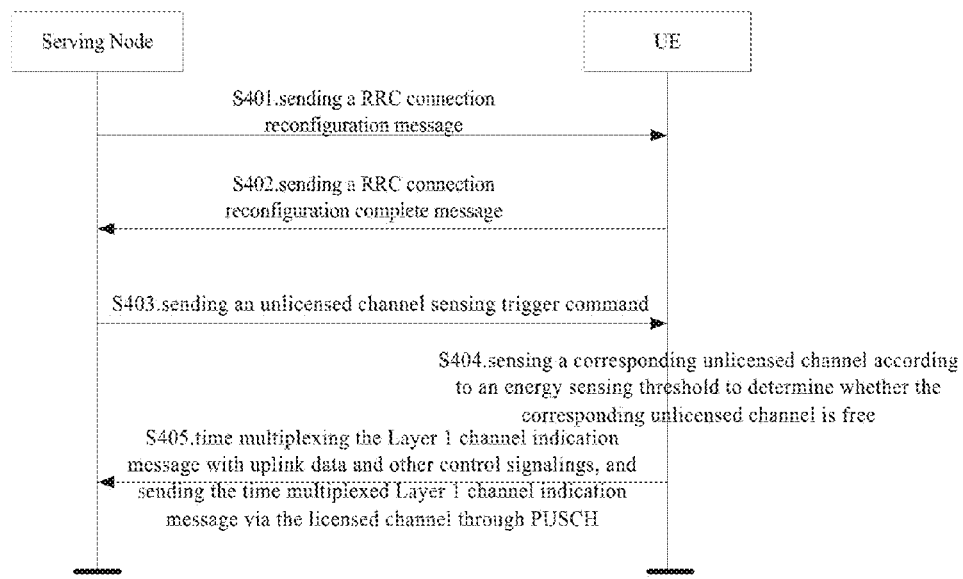
FIG. 4 shows a method flowchart of a method for fast channel measurement and feedback in a LTE licensed-assisted access (LAA) based communication system according to another embodiment of the present invention.

FIG. 4 shows a method flowchart of a method for fast channel measurement and feedback in a LTE licensed-assisted access (LAA) based communication system according to another embodiment of the present invention. In the embodiment of FIG. 4, the UE, will send a Layer 1 channel indication message to the serving node aperiodically.

As shown in FIG. 4, in step S401, the serving node sends a RRC connection reconfiguration message to the UE. The RRC connection reconfiguration message includes the following parameter: at least one energy sensing threshold corresponding to at least one unlicensed channel.

In step S402, the UE sends a RRC connection reconfiguration complete message to the serving node.

Then, in step S403, the serving node sends an unlicensed channel sensing trigger command to the UE, the unlicensed channel sensing trigger command indicating the UE to sense the at least one unlicensed channel.

Figure 5:
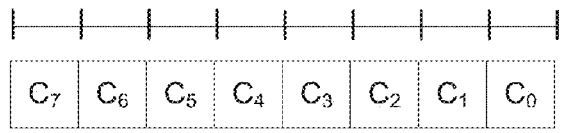
FIG. 5 shows a schematic diagram of a MAC control element according to one embodiment of the present invention.

Advantageously, this unlicensed channel sensing trigger command could be a Layer 2 control element, MAC control element, for example, or a Layer 1 command. In an embodiment of the present invention, this kind of MAC control element could be identified by configuring a new logic channel ID for a MAC PDU subheader. FIG. 5 shows a schematic diagram of a MAC control element according to one embodiment of the present invention. The $C_i$ is set to "1" to indicate this unlicensed channel should be sensed. Otherwise, $C_i$ is set to "0" to indicate this unlicensed channel needs not to be sensed.

Alternatively, downlink control information (DCI) can also be used. Specifically, the unlicensed channel sensing trigger command is sent according, to the DCI format. For example, the ID of the unlicensed channel needed to be sensed could be included.

In step S404, the UE senses the corresponding unlicensed channel according to an energy sensing threshold to determine whether the corresponding unlicensed channel is free. The detail implementation of this step is similar with the corresponding step in FIG. 2 and would not be discussed in detail herein.

In step S405, the UE time multiplexes the Layer 1 channel indication message with uplink data and other control signalings. Herein, the Layer 1 channel indication message can also be flexible according to the number of the unlicensed channels needed to be sensed. For example, if only one unlicensed channel needs to be sensed, 1 bit is used to indicate the situation of the corresponding unlicensed channel. If multiple unlicensed channels need to be sensed, multiple Layer 1 channel indication messages could be sent, each Layer 1 channel indication message including the ID of the unlicensed channel and the situation of the corresponding unlicensed channel. Alternatively, multiple bits can be used in one Layer 1 channel indication message to indicate the situations of multiple unlicensed channels in the same time.

It is also appreciated that the Layer 1 channel indication message can be further configured according to whether the serving node has WLAN transceiver capacity.

Figure 6:
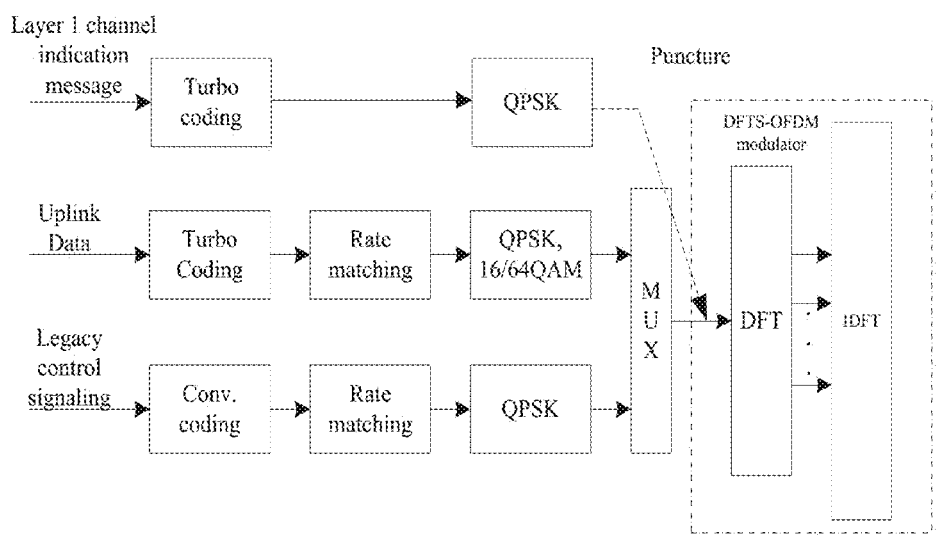
FIG. 6 shows a schematic diagram of time multiplexing a Layer 1 channel indication message according to one embodiment of the present invention.

FIG. 6 shows a schematic diagram of time multiplexing a Layer 1 channel indication message according to one embodiment of the present invention. As show in FIG. 6, the UE time multiplexes the Layer 1 channel indication message with uplink data and other legacy control signalings.

Still refer to FIG. 4, in step S405, the UE sends the time multiplexed Layer 1 channel indication message via the licensed channel through PUSCH.

Then, the serving node can use the free unlicensed channel for communication timely.

Figure 7:
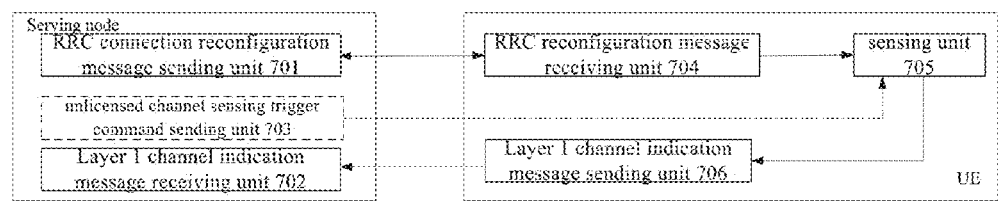
FIG. 7 shows a schematic diagram of an apparatus for fast channel measurement and feedback in a LTE licensed-assisted access (LAA) based communication system according to another embodiment of the present invention.

FIG. 7 shows a schematic diagram of an apparatus for fast channel measurement and feedback in a LTE licensed-assisted access (LAA) based communication system according to another embodiment of the present invention.

As shown in FIG. 7, the serving node comprises a RRC connection reconfiguration message sending unit 701 and a Layer 1 channel indication message receiving unit 702. The LTE comprises a RRC reconfiguration message receiving unit 704, a sensing unit 705 and a Layer 1 channel indication message sending unit 706.

According to the present invention, fast channel measurement and feedback can be conduct periodically. Alternatively, fast channel measurement and feedback can be conduct aperiodically. In the embodiment of aperiodic fast channel measurement and feedback, the serving node further includes an unlicensed channel sensing trigger command sending unit 703.

Firstly, the embodiment of periodic fast channel measurement and feedback will be described.

The RRC connection reconfiguration message sending unit 701 of the serving node is configured for sending a RRC connection reconfiguration message to the RRC connection reconfiguration message receiving unit 704 of the UE.

In the embodiment of periodic fast channel measurement and feedback of the present invention, the RRC connection reconfiguration message includes at least one energy sensing threshold, at least one sensing period, at least one subframe offset, at least one PUCCH resource location indicator and at least one PUCCH resource index, which correspond to the at least one unlicensed channel respectively.

Then, the RRC reconfiguration message receiving unit 704 of the UE is configured for sending a RRC connection reconfiguration complete message to the RRC reconfiguration message sending unit 701 of the serving node.

The sensing unit 705 of the UE is configured for sensing a corresponding unlicensed channel according to an energy sensing threshold to determine whether the corresponding unlicensed channel is free.

Specifically, the sensing unit 705 of the UE is further configured for determining a beginning point to sense a corresponding unlicensed channel based on a subframe offset, and sensing the corresponding unlicensed channel according to an energy sensing threshold periodically based on a sensing period to determine whether the corresponding unlicensed channel is free.

Then, the Layer 1 channel indication message sending unit 706 of the LYE is configured for sending a Layer 1 channel indication message via a licensed channel to the serving node, the Layer 1 channel indication message indicating whether the corresponding unlicensed channel is free.

Specifically, the Layer 1 channel indication message sending unit 706 is further configured for determining a PUCCH resource used to send the Layer 1 channel indication message for the corresponding unlicensed channel according to a PUCCH resource location indicator, and code division multiplexing the PUCCH resource according to a PUCCH resource index, so as to send the Layer 1 channel indication message on the code division multiplexed PUCCH resource via the licensed channel to the Layer 1 channel indication message receiving unit 702 of the serving node periodically based on the sensing period.

In the following, the embodiment of aperiodic fast channel measurement and feedback will be described.

The RRC connection reconfiguration message sending unit 701 of the serving node is configured for sending a RRC connection reconfiguration message to the RRC connection reconfiguration message receiving unit 704 of the UE.

Herein, the RRC connection reconfiguration message includes at least one energy sensing threshold corresponding to at least one unlicensed channel.

Then, the RRC reconfiguration message receiving unit 704 of the UE is configured for sending a RRC connection reconfiguration complete message to the RRC reconfiguration message sending unit 701 of the serving node.

After then, at a certain time point for sensing, the unlicensed. channel sensing trigger command sending unit 703 in the serving node is configured for sending an unlicensed channel sensing trigger command to the sensing unit 705 of the UE, the unlicensed channel sensing trigger command indicating the user equipment to sense the at least one unlicensed channel.

The sensing unit 705 of the UE is configured for sensing a corresponding unlicensed channel according to an energy sensing threshold to determine whether the corresponding unlicensed channel is free.

Then, the Layer 1 channel indication message sending unit 706 of the UE is configured for sending a Layer 1 channel indication message via a licensed channel to the Layer 1 channel indication receiving unit 702 of the serving node, the Layer 1 channel indication message indicating whether the corresponding unlicensed channel is free.

Specifically, the Layer 1 channel indication message sending unit 706 is configured for time multiplexing the Layer 1 channel indication message with uplink data and other control signalings, and sending the time multiplexed Layer 1 channel indication message via the licensed channel through PUSCH.

It shall be appreciated that the foregoing embodiments are merely illustrative but will not limit the invention. Any technical solutions without departing from the spirit of the invention shall fall into the scope of invention, including the use of different technical solutions appearing in different embodiments, and an apparatus and a method can be combined to advantage. Moreover any reference numerals in the claims shall not be construed as limiting the claims in question; and the term "comprising" will not preclude another device(s) or step(s) which is (are) listed in the other claim(s) or the description.

The invention claimed is:

1. A method for channel measurement and feedback in a serving node for use in a LTE Licensed-Assisted Access (LAA) based communication system, the method comprising:
   sending, to a user equipment, a radio resource control (RRC) connection reconfiguration message including,
      at least one energy sensing threshold for use by the user equipment for sensing whether at least one unlicensed channel is free, and
      at least one PUCCH resource location indicator indicating at least one PUCCH resource to be used by the user equipment to send at least one Layer 1 channel indication message for the at least one unlicensed channel; and
   receiving, from the user equipment on the at least one PUCCH resource via a licensed channel, the at least one Layer 1 channel indication message indicating whether the at least one unlicensed channel is free according to the at least one energy sensing threshold and the at least one PUCCH resource location indicator corresponding to the at least one unlicensed channel.

2. The method according to claim 1, wherein:
   the RRC connection reconfiguration message further includes,
      at least one sensing period during which the user equipment is to sense the at least one unlicensed channel and send the at least one Layer 1 channel indication message for the at least one unlicensed channel,
      at least one subframe offset indicating at least one beginning point at which the user equipment is to start sensing the at least one unlicensed channel, and
      at least one PUCCH resource index for assisting the user equipment in code division multiplexing the at least one PUCCH resource; and
   the receiving further includes, receiving the at least one Layer 1 channel indication message via the licensed channel on the code division multiplexed at least one PUCCH resource from the user equipment periodically according to the at least one sensing period, the at least one subframe offset, and the at least one PUCCH resource index corresponding to the at least one unlicensed channel.

3. The method according to claim 1, further comprising: receiving a RRC connection reconfiguration complete message from the user equipment.

4. The method according to claim 3, further comprising: sending an unlicensed channel sensing trigger command to the user equipment indicating the user equipment is to sense the at least one unlicensed channel; and receiving the at least one Layer 1 channel indication message via the licensed channel from the user equipment through PUSCH.

5. The method according to claim 4, wherein the unlicensed channel sensing trigger command includes a MAC control element and a Layer 1 command.

6. The method according to claim 1, wherein the at least one Layer 1 channel indication message includes 1 bit to indicate whether the at least one unlicensed channel is free, in response to the serving node having no WLAN transceiver capability.

7. The method according to claim 1, wherein the at least one Layer 1 channel indication message includes a destination field and a duration field for indicating a free duration of the at least one unlicensed channel, in response to the serving node having WLAN transceiver capability.

8. The method according to claim 1, wherein the serving node includes a WLAN access node and a base station.

9. A method for channel measurement and feedback for use in a user equipment in a LTE Licensed-Assisted Access (LAA) based communication system, the method comprising:
receiving, from a serving node, a radio resource control (RRC) connection reconfiguration message including,
at least one energy sensing threshold corresponding to at least one unlicensed channel, and
at least one PUCCH resource location indicator corresponding to the at least one unlicensed channel;
sensing the at least one unlicensed channel according to the at least one energy sensing threshold to determine whether the at least one unlicensed channel is free;
determining at least one PUCCH resource to be used by the user equipment to send at least one Layer 1 channel indication message for the at least one unlicensed channel according to the at least one PUCCH resource location indicator; and
sending, to the serving node on the at least one PUCCH resource via a licensed channel, the at least one Layer 1 channel indication message indicating whether the at least one unlicensed channel is free.

10. The method according to claim 9, wherein:
the RRC connection reconfiguration message further includes,
at least one sensing period corresponding to the at least one unlicensed channel,
at least one subframe offset corresponding to the at least one unlicensed channel, and
at least one PUCCH resource index corresponding to the at least one unlicensed channel;
the sensing further includes,
determining at least one beginning point at which the user equipment is to start sensing the at least one unlicensed channel according to the at least one subframe offset, and
sensing the at least one unlicensed channel periodically according to the at least one sensing period to determine whether the at least one unlicensed channel is free; and
the sending further includes,
code division multiplexing the at least one PUCCH resource according to the at least one PUCCH resource index, and
sending the at least one Layer 1 channel indication message on the code division multiplexed at least one PUCCH resource via the licensed channel to the serving node periodically according to the at least one sensing period.

11. The method according to claim 9, further comprising:
sending a RRC connection reconfiguration complete message to the serving node.

12. The method according to claim 11, further comprising:
receiving an unlicensed channel sensing trigger command from the serving node indicating the user equipment is to sense the at least one unlicensed channel;
time multiplexing the at least one Layer 1 channel indication message with uplink data and other control signals; and
sending the time multiplexed at least one Layer 1 channel indication message to the serving node via the licensed channel through PUSCH.

13. The method according to claim 9, wherein the at least one Layer 1 channel indication message includes 1 bit to indicate whether the at least one unlicensed channel is free, in response to the serving node having no WLAN transceiver capability.

14. The method according to claim 9, wherein the at least one Layer 1 channel indication message includes a destination field and a duration field for indicating a free duration of the at least one unlicensed channel, in response to the serving node having WLAN transceiver capability.

15. A serving node for channel measurement and feedback for use in a LTE Licensed-Assisted Access (LAA) based communication system, the serving node comprising:
a memory configured to store computer-readable instructions; and
a processor configured to execute the computer-readable instructions to cause the serving node to,
send, to a user equipment, a radio resource control (RRC) connection reconfiguration message including,
at least one energy sensing threshold for use by the user equipment for sensing whether at least one unlicensed channel is free, and
at least one PUCCH resource location indicator indicating at least one PUCCH resource to be used by the user equipment to send at least one Layer 1 channel indication message for the at least one unlicensed channel; and
receive, from the user equipment on the at least one PUCCH resource via a licensed channel, the at least one Layer 1 channel indication message indicating whether the at least one unlicensed channel is free according to the at least one energy sensing threshold and the at least one PUCCH resource location indicator corresponding to the at least one unlicensed channel.

16. The serving node according to claim 15, wherein:
the RRC connection reconfiguration message further includes,
at least one sensing period during which the user equipment is to sense the at least one unlicensed channel and send the at least one Layer 1 channel indication message for the at least one unlicensed channel,
at least one subframe offset indicating at least one beginning point at which the user equipment is to start sensing the at least one unlicensed channel, and
at least one PUCCH resource index for assisting the user equipment in code division multiplexing the at least one PUCCH resource; and
the processor is further configured to execute the computer-readable instructions to cause the serving node to,
receive the at least one Layer 1 channel indication message via the licensed channel on the code division multiplexed at least one PUCCH resource from the user equipment periodically according to the at least one sensing period, the at least one subframe offset, and the at least one PUCCH resource index corresponding to the at least one unlicensed channel.

17. A user equipment for channel measurement and feedback for use in a LTE Licensed-Assisted Access (LAA) based communication system, the user equipment comprising:
a memory configured to store computer-readable instructions; and
a processor configured to execute the computer-readable instructions to cause the user equipment to, receive, from a serving node, a radio resource control (RRC) connection reconfiguration message including,
   at least one energy sensing threshold corresponding to at least one unlicensed channel, and
   at least one PUCCH resource location indicator corresponding to the at least one unlicensed channel;
sense the at least one unlicensed channel according to the at least one energy sensing threshold to determine whether the at least one unlicensed channel is free;
determine at least one PUCCH resource to be used by the user equipment to send at least one Layer 1 channel indication message for the at least one unlicensed channel according to the at least one PUCCH resource location indicator; and
send, to the serving node on the at least on PUCCH resource via a licensed channel, the at least one Layer 1 channel indication message indicating whether the at least one unlicensed channel is free.

18. The user equipment according to claim 17, wherein:
the RRC connection reconfiguration message further includes,
   at least one sensing period corresponding to the at least one unlicensed channel,
   at least one subframe offset corresponding to the at least one unlicensed channel, and
   at least one PUCCH resource index corresponding to the at least one unlicensed channel; and
the processor is further configured to execute the computer-readable instructions to cause the user equipment to,
   determine at least one beginning point at which the user equipment is to start sensing the at least one unlicensed channel according to the at least one subframe offset;
   sense the at least one unlicensed channel periodically according to the at least one sensing period to determine whether the at least one unlicensed channel is free;
   code division multiplex the at least one PUCCH resource according to the at least one PUCCH resource index; and
   send the at least one Layer 1 channel indication message on the code division multiplexed at least one PUCCH resource via the licensed channel to the serving node periodically according to the at least one sensing period.

* * * * *